United States Patent
Ortiz et al.

(10) Patent No.: US 10,362,480 B2
(45) Date of Patent: Jul. 23, 2019

(54) SYSTEMS, METHODS AND APPARATUSES FOR ENABLING WEARABLE DEVICE USER ACCESS TO SECURED ELECTRONICS SYSTEMS

(71) Applicants: Luis M. Ortiz, Albuquerque, NM (US); Sofia A. Ortiz, Albuquerque, NM (US); Luis Miguel Ortiz, Albuquerque, NM (US)

(72) Inventors: Luis M. Ortiz, Albuquerque, NM (US); Sofia A. Ortiz, Albuquerque, NM (US); Luis Miguel Ortiz, Albuquerque, NM (US)

(*) Notice: Subject to any disclaimer, the term of this patent is extended or adjusted under 35 U.S.C. 154(b) by 208 days.

(21) Appl. No.: 15/234,565

(22) Filed: Aug. 11, 2016

(65) Prior Publication Data
US 2017/0048707 A1    Feb. 16, 2017

Related U.S. Application Data

(60) Provisional application No. 62/204,050, filed on Aug. 12, 2015.

(51) Int. Cl.
*H04W 12/06* (2009.01)
*H04L 29/06* (2006.01)
(Continued)

(52) U.S. Cl.
CPC ........ *H04W 12/06* (2013.01); *G07C 9/00087* (2013.01); *G07C 9/00309* (2013.01); *G07C 9/00563* (2013.01); *G07C 9/00571* (2013.01); *H04L 63/0853* (2013.01); *H04L 63/0861* (2013.01); *H04M 1/7253* (2013.01); *H04W 60/00* (2013.01); *G07C 2009/00095* (2013.01);
(Continued)

(58) Field of Classification Search
CPC .. H04W 12/06; H04W 60/00; H04L 63/0861; H04L 63/0853; H04M 1/7253; H04M 1/72533; H04M 2250/02; G07C 9/00309; G07C 9/00087; G07C 9/00563; G07C 2009/00976; G07C 2009/0095
USPC ........................................... 340/5.82
See application file for complete search history.

(56) References Cited

U.S. PATENT DOCUMENTS

7,630,721 B2 * 12/2009 Ortiz ................... G06Q 10/06
                                                    455/456.1
9,031,537 B2    5/2015 Ortiz et al.
(Continued)

*Primary Examiner* — John F Mortell (57) ABSTRACT

Systems, methods, and apparatuses disclosed enable wearable device (e.g., smartwatch) user access to secured electronic systems based on at least one of user authentication for access to secured electronic system by the wearable device, user biometric authentication by a wireless carrier, user biometric authentication by remote server, user location, and user proximity to a secured electronic system. A wearable device can include a telecommunications carrier identification module (e.g., SIM), cellular RF communications, and short-range RF communications. A registration module can register secure electronic systems, authenticate a wearable device user, and grant the wearable device user with access to secured electronic systems if the wearable device user is authenticated by at least one of the wearable device, the registration module, a carrier network, a remote server, and the secured electronic system. Authentication can include biometric measurement facilitated by the wearable device.

9 Claims, 4 Drawing Sheets

(51) Int. Cl.
*H04M 1/725* (2006.01)
*H04W 60/00* (2009.01)
*G07C 9/00* (2006.01)
*H04M 1/67* (2006.01)

(52) U.S. Cl.
CPC .............. *G07C 2009/00769* (2013.01); *G07C 2009/00968* (2013.01); *H04M 1/67* (2013.01); *H04M 2250/02* (2013.01)

(56) References Cited

U.S. PATENT DOCUMENTS

| | | | |
|---|---|---|---|
| 2015/0028996 A1* | 1/2015 | Agrafioti | G06F 21/40 340/5.82 |
| 2016/0155281 A1* | 6/2016 | O'Toole | G07C 9/00182 340/5.64 |
| 2017/0270729 A1* | 9/2017 | O'Toole | G07C 9/00182 |

* cited by examiner

SYSTEMS, METHODS AND APPARATUSES FOR ENABLING WEARABLE DEVICE USER ACCESS TO SECURED ELECTRONICS SYSTEMS

INVENTION PRIORITY

The present invention claims priority to U.S. Provisional Patent Application Ser. No. 62/204,050 entitled "SYSTEMS, METHODS AND APPARATUSES FOR ENABLING WEARABLE DEVICE USER ACCESS TO SECURED ELECTRONIC SYSTEMS," filed Aug. 12, 2015, which is herein incorporated by reference in its entirety.

TECHNICAL FIELD

Embodiments generally relate to electronic system security and access. Embodiments additionally relate to wearable devices. Embodiment also relate to telecommunications including cellular and short-range radio frequency communications. More particularly, embodiments related to system, methods, and apparatuses for enabling wearable device user access to secured electronic systems.

BACKGROUND OF THE INVENTION

Secured electronic system as discussed in this document to teach features of the present invention can include remote servers, physical barriers entries (e.g., doors, gates, garage doors, safes) requiring entry of a passcode for access, vehicle ignitions requiring physical manipulation of a key to initiate starting of an engine, equipment requiring keys, passwords or initiation routines for their access and use, as well as other protected systems physical manipulation or several steps for access/use.

Wearable devices are growing in popularity and typically include a microprocessor to provide some useful or entertaining function. A technologically sophisticated version of wearable device that has recently been released to consumers is being referred to as a "smartwatch." There are few applications for smartwatches given their short market life thus far. An example are what is currently being referred to as "smartwatches" such as Apple Corporation's "Apple Watch"™, Samsung Corporation's "Gear"™, Sony "SmarthWatch"™, and LG "Urbane"™. Recently, Samsung and LG began providing smartwatches incorporating SIMs. Users requiring telecommunications network access are typically limited to accessing a cellular data network with their smartphone devices, it typically being the only device carried by the user with a SIM, equipment identification and associated wireless carrier subscriber account. That will now be changing with the integration of smartwatches that can communicate with wireless telecommunications carriers. Smartwatches will likely be the most pervasively used form of wearable device and could reduce user dependence on larger form factor devices for certain applications where it is a burden to retrieve and operate a portable, electronic wireless hand held devices.

There are so many portable devices available to users. It is not uncommon for a user to have two or three devices with them at a time that enable at least some form of wireless communication (e.g., cellular, Bluetooth, NFC) and data access. Wearable devices are also now available including computing and wireless communication capability. Electronic wireless hand held devices, such as data/video-enabled cellular telephones (often referred to as "mobile phones" or "smartphones"), tablet computers, and other portable, hand held wireless data-enabled devices have become a part of everyday life. Such mobile device are capable of multimedia data transmission and retrieval from multiple networks and wireless connections including: cellular (including 4G/LTE, 802.11 WiFi networks), short range radio frequency, and/or line of sight communications standards and networks such those that are standardized including Bluetooth, Bluetooth LE, IrDA (infrared), RFID, NFC, and other proprietary, secure means that are not yet standardized. Many current mobile devices are capable of determining location information and directions using GPS and by displaying maps retrieved from remote servers (e.g., via the Internet), include touch sensitive display screens, and incorporate high-resolution cameras. Mobile devices are capable of moving data to/from, and operating with, removable cartridges (e.g., external memory, smart card, card-based application modules and electronics) and/or via wireless communication to neighboring devices.

A subscriber identity module or subscriber identification module (SIM) card can be provided in the form of a physical module with an integrated circuit that is intended to securely store the international mobile subscriber identity (IMSI) number and its related key, which are used to identify and authenticate a subscriber of a single mobile device, and can be removable for use in other devices. It is also possible to store contacts on the SIM cards. SIM cards are always used on GSM phones: for CDMA phones, they are only needed for newer LTE-capable handsets. Some CDMA devices also have a similar card called a R-UIM. SIM cards can also be used in satellite phones. Individual GSM, WCDMA, iDEN, and some satellite phone devices are uniquely identified by an International Mobile Equipment Identity (IMEI) number. Some mobile devices do not require or use a SIM card, but rely on a mobile equipment identifier (MEID) to identify the device and be authorized to receive carrier services. A Mobile Equipment Identifier (MEID) is 14 digits long and is used to identify a cell phone that utilizes the COMA technology for wireless service. COMA phones don't typically have SIM cards and CDMA (Code Division Multiple Access) is just a type of technology used for wireless phone service. An International Mobile Station Equipment Identity or IMEI for short is a number that identifies mobile phones that run on a GSM network. GSM is just another type of wireless technology used for mobile service.

What is needed are systems, methods, and apparatuses that enable a user of a wearable device (e.g., smartwatch) to access secure electronic systems.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification claims, drawings, and abstract as a whole.

It is, therefore, one aspect of the disclosed embodiments to provide improved systems, methods, and apparatuses that enable a wearable device user to access secured electronic systems. Examples of secured electronic systems include: secured entry barriers (e.g., doors, gates, safes), vehicle (e.g., to compartment access and start ignition), equipment (e.g., industrial, medical, laboratory, etc.), automatic teller machines, payment mechanisms (e.g., vending machines, parking meters), point-of-sale (POS), and secured databases (e.g. remote servers containing health care/patient information).

It is, therefore, another aspect of the disclosed embodiments to provide improved systems, methods, and apparatuses that enable a wearable device in the form of a smartwatch carrier access and subscriber account associated therewith to access secure electronic systems where a remote server can be accessed over a data network to authenticate a user.

It is yet another feature of the disclosed embodiments that a user can be authenticated by biometric hardware (e.g., voice, skin illumination) integrated on the smartwatch worn by the user prior to granting secured electronic system access.

It is yet another feature of the embodiments that a user can access a secured electronic system when the smartwatch worn by the user is in short-range radio frequency communication with the electronic system.

It is yet another aspect of the disclosed embodiments to enable a wearable device in the form of a smartwatch that includes carrier access and associated subscriber account associated therewith to serve to authenticate a user for access to a secured electronic systems that is registered for access by a user associated with the smartwatch, and access can further be provided when the wearable device and user is within short RE communication range of the secured electronic system.

It is yet another feature that biometrics integrated with the wearable device can support user authentication to include voice authentication via a microphone integrated with the wearable device, and skin layer illumination using a laser light source integrated within the wearable device when in contact with a user skin, vital patterns (e.g., heart rate pattern) obtained via the light source integrated within the wearable device when in contact with a user's skin, or any combination.

It is yet another aspect of the disclosed embodiments to enable a wearable device (e.g., smartwatch) that includes a GPS module, carrier access, and active subscriber account associated with the SIM, and the wearable device serves as the single, common portal to receive/obtain/transmit wireless voice calls, text, other application data and account access on behalf of the wearable device user in association with the users carrier subscriber account and enables access to secured electronic systems by the wearable device when the user via wearable device worn by user is determined by the GPS module to be located near the secured electronic system.

It is yet another feature of the present invention to provide a smartwatch for placement on a users wrist that includes modules to carry out authentication of the user, determine the users location, enable carrier data network communications with the smartwatch, and enable user access to secured electronic systems based on at least one of: user biometric authentication, user location, user proximity to a secured electronic system, and registration of the secured electronic system with the wearable device.

These and other features and embodiments of the present invention will become apparent to the skilled after reading the following detailed description and the appended claims.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the principles of the present invention.

DETAILED DESCRIPTION

The particular values and configurations discussed in these non-limiting examples can be varied and are cited merely to illustrate at least one embodiment and are not intended to limit the scope thereof.

Unlike personal computers, which are general-purpose devices geared towards refining and processing information, modern mobile communication devices are designed to capture, store, and display information originating from various sources while a user is "on the go" or otherwise mobile. Additionally, while a certain level of skill is required to use a personal computer effectively, mobile devices are designed with the novice and non-computer user in mind and are therefore intuitively easy to use. Mobile communications devices are typically used in a smartphone or tablet format. US Pat. No. 9,031,537, which is entitled "Electronic Wireless Hand Held Multimedia Device", is representative of such a device and is incorporated herein by reference for its teaching. Either of these particular device formats can include a SIM to provide user access to carrier networks and account data (including voice, text, and application specific date retrievable remotely from servers). Much of the functionality that has previously been provided in smartphone and tablet format is now available on wearable devices in the form of a watch. "Smartwatch" is the general term for such a device. Some smartwatches will soon be including a SIM. There are few applications, however, to date for smartwatches given their infancy in the consumer marketplace.

The present invention provides wearable device users (in particular, smartwatch users) access to secured electronic systems. A secured electronic system can be broadly defined herein as a system requiring electronic initiation for its operation or to gain access to it. Examples include: secured entries having electromechanical locking systems that can be operated (unlocked) electronically with access codes; wireless vehicle compartment access and ignition initiation; equipment (industrial, medical, laboratory) secured by electronic codes for access and use; automatic teller machines; payment mechanisms; points-of-sale; and secured server or databases including protected information (e.g., patient records/information). The present invention can provide authorized users/wearers of a wearable device in the form of a smartwatch to gain access to secured electronic systems, even if access requires any of: a determination of user identity, biometric measurement, location determination, access to remote data, and proximity to the secured electronic system.

Figure 1:
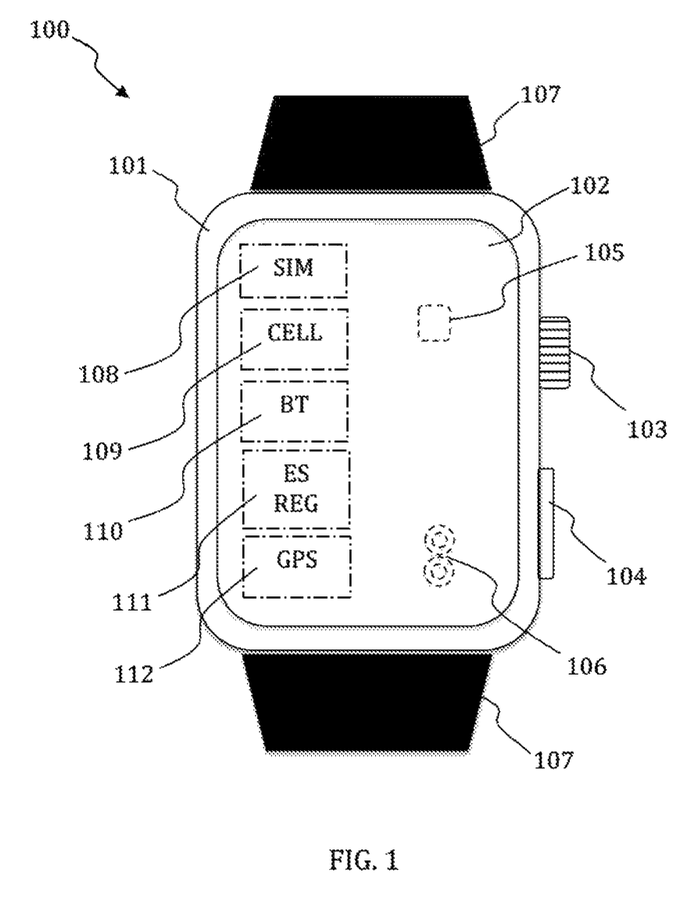
FIG. 1 illustrates a block diagram of a wearable device in the form of a smartwatch that can include, among other items, a carrier access (represented by a SIM), cellular network communications module supporting RF communications with a telecommunication carrier network, short-range RF communications module supporting communication with devices in close proximity to the wearable device, GPS module for determining wearable device (and user) location, and secured electronic system registration module for registering secured electronic devices, which can be implemented in accordance with embodiments of the present invention.

Referring to FIG. 1, illustrated is a block diagram of a wearable device 100 in the form of a smartwatch, which includes a housing 101 having an integrated display screen 102, physical user interfaces 103/104, integrated microphone 105, skin illumination/reading sensors 106, and straps 107 to secure the smartwatch to a user's wrist. The display screen can be touch sensitive and can provide part of the user interface with the smartwatch 100. The physical user interfaces can be provided in the form of a rotatable crown 103 and at least one push-button 104. Modules that can also be included are a module for identifying the wearable device identification information to a carrier network and is being identified generally as an subscriber identification module (SIM) 108 without limitation to SIMs that are physical and removable form devices, cellular RF communications module 109. Bluetooth communications module 110 (although use of other RF short range modules and standards is possible), and specialized electronic system registration module 111. The SIM 108 enables communication of the wearable device for its authorized user with a telecommunication carrier's network (e.g., Verizon, Sprint AT&T, etc.) to enable the user of the smartwatch 100 to receive/place voice calls, receive/transmit text messages, and access data networks and remote assets (e.g., remote servers).

The cellular communications module 109 and Bluetooth communications module 110 each support bi-directional data radio frequency (RF) communications of the smartwatch 100. The cellular communications module 109 supports RF communication of the smartwatch 100 with a cellular data telecommunications networks provided by telecommunications carriers (e.g., GSM, CDMA, etc.). Bluetooth communications module 110 supports bi-directional data RE communications of the smartwatch 100 with secured electronic systems. Electronic System (ES) registration module 111 provides specialized application software to support registration of a secured electronic system with the smartwatch, and facilitates the establishment of wireless communication between the smartwatch 100 and a registered secured electronic system. A user can be authenticated for access via smartwatch carrier network access, and communication with secured electronic systems, via biometric authentication, which can be facilitated by the SIM 108 and software in the electronic system registration module 111. Biometrics can be obtained from a user via voice spoken into the microphone 105 or by obtaining skin measurements via skin illumination and reading hardware 106, or a combination of both biometrics.

Additionally, a GPS (Global Positioning System) module 112 can be included in the wearable device 100. GPS module 112 can be configured to provide location information for the wearable device 100 in relation to secured electronic systems, and can operate with mapping software and resources to provide navigable directions on the display screen 102 to the user, which can be referred to as GPS mapping.

Figure 2:
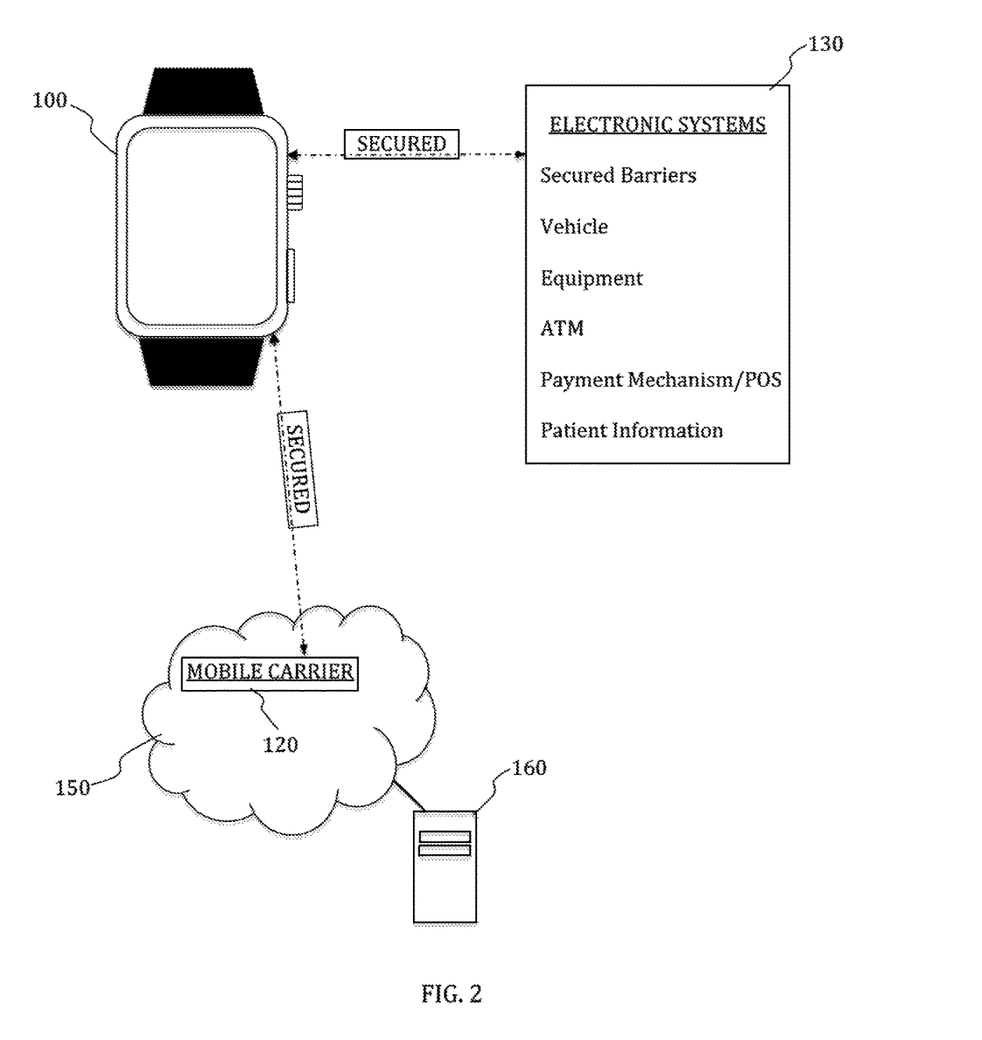
FIG. 2 illustrates a block diagram representing a wearable device in the form of a smartwatch supporting secure communication and access by the smartwatch to a mobile carrier network, data network, remote server, and electronic systems, which can be implemented in accordance with an alternative embodiment.

FIG. 2 illustrates a block diagram representing a smartwatch 100 as illustrated in FIG. 1 providing secured access to secured electronic systems 130. The smartwatch 100 is also in secure communications with a carrier network 120 (e.g., Verizon, Sprint, AT&T, T-Mobile, etc., in the United States), which can provide further access to other Internet 150 resources, such as a remote secured server 160. The secured electronic systems listed in block 130 can be registered with the smartwatch 100 using electronic system (ES) registration module 111 for communication with/through a carrier network, if necessary to authenticate a user of the smartwatch 100. It should be understood that initial registration of secured electronic systems 130 can be with at least one of the carrier network 120, the smartwatch 100, or a remote server 160. It should be noted that registration of a secured electronic system is different from merely setting up a Bluetooth connection ("pairing") with the portable devices. For example, a user can access a vehicle that is registered with the smartwatch 100 (or service accessible by the smartwatch) when the user is authenticated to access the vehicle by the smartwatch 100 and is in close proximity to the vehicle as determined by the smartwatch 100. Ideally, the vehicle door can unlock automatically for the user when the user is within ten feet of the vehicle. Then, the authenticated user can start the ignition of the vehicle when the smartwatch 100 is again in close proximity (ideally less than five feet) to the ignition button or the user is determined based by the RF signal from the smartwatch to be located in driver seat. The smartwatch can be paired when Bluetooth is used as the short-range RF transmission standard, but Bluetooth LE pairing does not guarantee that an authenticated user of the registered vehicle is attempting to use the vehicle, which is why user authentication and secured electronic system registration can be uniquely provided as taught herein.

Figure 3:
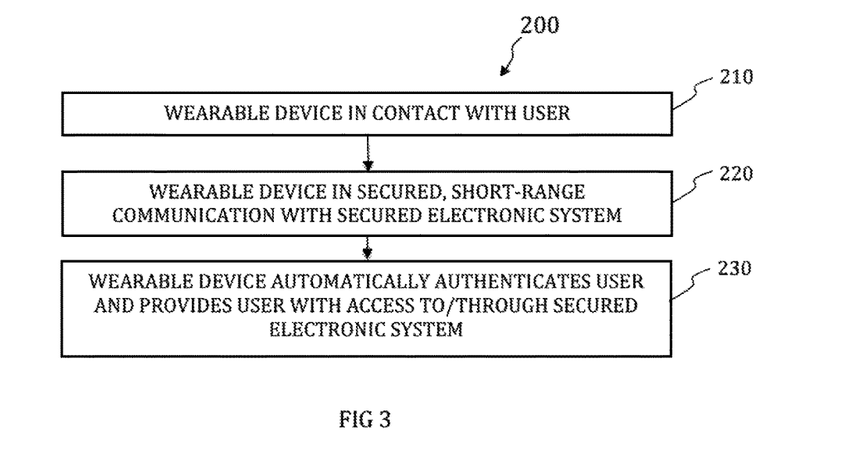
FIGS. 3-5 illustrate flow diagrams of methods of providing a user of a wearable device with access to secured electronic systems.
Figure 4:
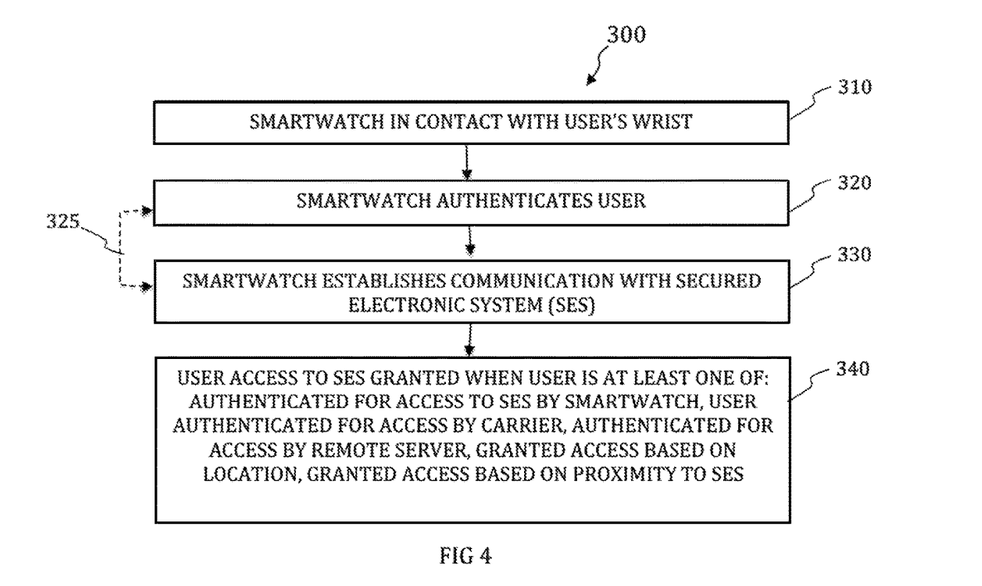
Figure 5:
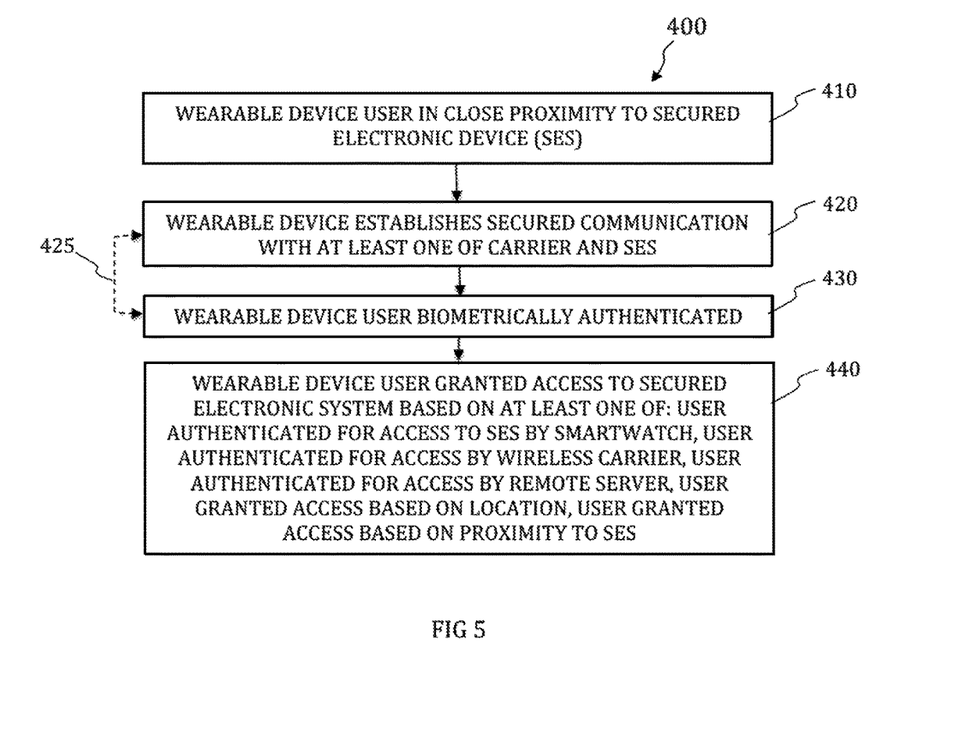

FIG. 3-5 illustrate flow diagrams of methods of providing a user of a smartwatch 100 access to secured electronic systems 130. Referring to the flow diagram 200 in FIG. 3, a wearable device (e.g., smartwatch) is placed in contact with a user as shown in block 210. Contact can refer to the placement of a wearable device on the wrist of a user in a manner where it is strapped snuggly so that the back of the wearable device contacts the skin of a user. As shown in block 220, the wearable device obtains secured, short-range communication with a secured electronic system. Then, as shown in block 230, the wearable device automatically authenticates the user and provides an authenticated user with access to/through a secured electronic system. The secured electronic systems can be registered with the smartwatch and recognized when short-range communications are established between them (e.g., Bluetooth pairing is accomplished).

Referring to FIG. 4, a flow diagram 300 illustrates another method of providing access to secured electronic systems via a smartwatch in accordance with the embodiments. Referring to block 310, a smartwatch is placed in contact with a user's wrist. The smartwatch then authenticates the user, as shown in block 320. The smartwatch then establishes communication with a secured electronic system, as shown in block 330. As shown by arrow labeled 325, block 330 can precede block 320 (communication established before authentication). Authentication can depend on whether it requires remote resources provided by the carrier, or if authentication only needs occur in the smartwatch. Authentication can be accomplished by password entry on the user interface (e.g., touch screen) of the smartwatch or by using the smartwatch to obtain biometric information from the user. Biometrics can include voice or skin illumination measurements as described before. Referring to block 340, the user can be granted access to a secured electronic system when at least one of the following conditions applies to the user: authenticated for access to secured electronic system by smartwatch; authenticated for access by network carrier; authenticated for access by remote server; granted access based on location, or granted access based on proximity to the secured electronic system.

Referring to FIG. 5, illustrated is a flow diagram 400 of another method for providing access to secured electronic systems via a wearable device. Referring to block 410, a wearable device user is determined to be in close proximity to a secured electronic system. In black 420, the wearable device establishes secured communication with at least one of a carrier and the secured electronic system. Block 430 provides that a wearable device user is biometrically authenticated. Authentication can be via a microphone or skin illumination hardware integrated in the smartwatch. As shown by arrow labeled 425, block 430 can occur before block 420. Finally, as shown in block 440, the wearable device user can be granted access to a secured electronic system when at least one of the following conditions applies: user authenticated for access to secure electronic system by the smartwatch; user authenticated for access to secure electronic system by carrier; user authenticated for access to secure electronic system by remote server; user granted access based on location; and user is granted access based on proximity to secure electronic system.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for enabling a wearable device user to access secured electronic systems, said method comprising:
    placing a wearable device in contact with a user, said wearable device including a telecommunications carrier access identification module, a cellular RF communications module, and a short-range RF communications module;
    achieving secured, short-range RF communication between the wearable device and a secured electronic system;
    authenticating the user with at least one of the wearable device, a remote server via cellular communications supported by the telecommunications carrier access identification module and the cellular RF communications module, and the secured electronic system via the secured, short-range RF communication; and
    providing the user with access to or through the secured electronic system once authenticated;
    wherein said wearable device comprises a smartwatch including a microphone and skin illumination and measurement hardware, and wherein authentication of the user is based on biometric information obtained from the user via at least one of the microphone and the skin illumination and measurement hardware.

2. A method for enabling a wearable device user to access secured electronic systems, said method comprising:
    placing a wearable device in contact with a user, said wearable device including a telecommunications carrier access identification module, a cellular RF communications module, and a short-range RF communications module;
    achieving secured, short-range RF communication between the wearable device and a secured electronic system;
    authenticating the user with at least one of the wearable device, a remote server via cellular communications supported by the telecommunications carrier access identification module and the cellular RF communications module, and the secured electronic system via the secured, short-range RF communication; and
    providing the user with access to or through the secured electronic system once authenticated;
    wherein said wearable device includes a GPS module for determining location of the wearable device user with respect to the secured electronic system, and wherein the step of providing a user access to or through the secured electronic systems is also dependent on the location of the wearable device user.

3. A method for enabling a wearable device user to access secured electronic systems, said method comprising:
    placing a wearable device in contact with a user, said wearable device including a telecommunications carrier access identification module, a cellular RF communications module, and a short-range RF communications module;
    achieving secured, short-range RF communication between the wearable device and a secured electronic system;
    authenticating the user with at least one of the wearable device, a remote server via cellular communications supported by the telecommunications carrier access identification module and the cellular RF communications module, and the secured electronic system via the secured, short-range RF communication; and
    providing the user with access to or through the secured electronic system once authenticated;
    wherein said wearable device further comprises a registration module, wherein providing a user access to or through the secured electronic system is determined by at least one of the wearable device and the registration module based on at least one of: the user authenticated for access to secured electronic system by the wearable device, the user biometrically authenticated for access by a wireless carrier, the user biometrically authenticated for access by remote server, the user granted access based on location, and the user granted access based on proximity to a secured electronic system.

4. The method of claim 2, wherein said wearable device further comprises a smartwatch including a microphone and skin illumination and measurement hardware, wherein authentication of the user is based on biometric information obtained from the user via at least one of the microphone and the skin illumination and measurement hardware.

5. The method of claim 1, wherein said wearable device further comprises a GPS module for determining location of the wearable device user with respect to secured electronic systems, and wherein access to the secured electronic systems is dependent on the location of the wearable device user in relationship to the secured electronic systems.

6. The method of claim 3, wherein said wearable device further comprises a smartwatch including a microphone and skin illumination and measurement hardware, wherein authentication of the user is based on biometric information obtained from the user via at least one of the microphone and the skin illumination and measurement hardware.

7. A method for enabling a smartwatch user to access secured electronic systems, said method comprising:
    placing a smartwatch in contact with a user, the smartwatch including a registration module, a short-range RF communications module, a microphone, and skin illumination and measurement hardware;

achieving secured, short-range RF communication between the smartwatch and a secured electronic system;

authenticating the user with at least one of the smartwatch and the secured electronic system using at least one biometric obtained from at least one of the microphone and the skin illumination and measurement hardware;

providing the user with access to or through the secured electronic system once authenticated; and a subscriber identification module (SIM) and a cellular communications module, wherein authentication of the user is also achievable by accessing a remote server via cellular communications supported by the SIM and the cellular communications module and matching the at least one biometric.

8. The method of claim 7, wherein the smartwatch wearable device includes a GPS module for determining location of the smartwatch user with respect to the secured electronic system, and wherein the step of providing a user access to or through the secured electronic systems is also dependent on a location of the smartwatch user with respect to a location of the secured electronic system.

9. The method of claim 8, wherein providing a user access to or through the secured electronic system is determined by the registration module based on at least one of: user authentication for access to secured electronic system by smartwatch, user biometric authentication by a wireless carrier, user biometric authentication by remote server, user location, and user proximity to a secured electronic system.

* * * * *